(12) United States Patent
Fast

(10) Patent No.: US 7,093,845 B1
(45) Date of Patent: Aug. 22, 2006

(54) MOTION ABSORBING HITCH

(75) Inventor: Verlyn R. Fast, Sioux Falls, SD (US)

(73) Assignee: Tendaire, Inc., Beresford, SD (US)

( * ) Notice: Subject to any disclaimer, the term of this patent is extended or adjusted under 35 U.S.C. 154(b) by 45 days.

(21) Appl. No.: 10/374,176

(22) Filed: Feb. 25, 2003

(51) Int. Cl.
*B60D 1/50* (2006.01)

(52) U.S. Cl. ...................................... 280/489; 280/511

(58) Field of Classification Search ................ 280/483, 280/484, 485, 486, 487, 511, 491.2, 491.5, 280/490.1
See application file for complete search history.

(56) References Cited

U.S. PATENT DOCUMENTS

| | | | | |
|---|---|---|---|---|
| 2,540,677 | A | * | 2/1951 | Kandt et al. ................ 280/486 |
| 2,797,934 | A | * | 7/1957 | Helgeson .................... 280/489 |
| 2,966,369 | A | * | 12/1960 | Paul ........................... 280/489 |
| 3,342,509 | A | * | 9/1967 | Sancioni ..................... 280/489 |
| 3,534,981 | A | * | 10/1970 | Moulton .................. 280/405.1 |
| 3,700,053 | A | * | 10/1972 | Glissendorf ................ 177/136 |
| 4,351,542 | A | * | 9/1982 | Lovell et al. ............... 280/489 |
| 4,773,668 | A | * | 9/1988 | Muonro ...................... 280/485 |
| 5,240,273 | A | * | 8/1993 | Stead et al. ................. 280/489 |
| 5,333,888 | A | * | 8/1994 | Ball ........................... 280/504 |
| 5,836,603 | A | | 11/1998 | Logan et al. |
| 5,887,884 | A | * | 3/1999 | Smith .......................... 280/489 |
| 6,155,588 | A | * | 12/2000 | Maxey ........................ 280/488 |
| 6,494,478 | B1 | * | 12/2002 | MacKarvich ............... 280/489 |
| 2003/0178811 | A1 | * | 9/2003 | Buckner ..................... 280/483 |

FOREIGN PATENT DOCUMENTS

| | | | | |
|---|---|---|---|---|
| FR | 519702 | * | 6/1921 | ................ 280/489 |
| FR | 1357102 | * | 2/1964 | ................ 280/489 |
| WO | WO81/01984 | * | 7/1981 | |

OTHER PUBLICATIONS

Easy Rider Air Ride Hitches, dated Oct. 10, 2002.
Air Ride Trailer Hitches, dated Oct. 10, 2002.

* cited by examiner

*Primary Examiner*—Anne Marie Boehler
(74) *Attorney, Agent, or Firm*—Woods Fuller Shultz & Smith PC; Jeffrey A. Proehl

(57) ABSTRACT

A motion absorbing hitch for dampening forces on a towing vehicle from movement of a trailer assembly towed by the towing vehicle includes a towing attachment assembly coupled to a towing vehicle, a trailer attachment assembly pivotally coupled to the towing attachment assembly and adapted for coupling to a trailer assembly, and a shock absorbing assembly coupled between the towing attachment assembly and the trailer attachment assembly to dampen pivoting between the towing attachment assembly and the trailer attachment assembly.

17 Claims, 8 Drawing Sheets

MOTION ABSORBING HITCH

BACKGROUND OF THE INVENTION

1. Field of the Invention

The present invention relates to hitch devices and more particularly pertains to a new motion absorbing hitch for dampening forces on a towing vehicle from movement of a trailer assembly towed by the towing vehicle.

2. Description of the Prior Art

The use of hitch devices is known in the prior art. U.S. Pat. No. 5,836,603 describes a shock absorbing hitch that employs a shock absorber and vertically oriented tracks and rollers to provide a floating hitch.

While this device fulfills the particular objectives and requirements it sets forth, the need remains for a motion absorbing hitch assembly that is simple yet effective, easily attaches to common existing hitches, and absorbs force in more than a vertical direction.

SUMMARY OF THE INVENTION

The present invention meets the needs presented above by providing a simple attachment assembly, a shock absorber that is positioned at an angle between vertical and horizontal to dampen vertical and horizontal forces between a towing vehicle and a trailer assembly.

An object of the present invention is to provide a new motion absorbing hitch that attached to a conventional existing hitch assembly using a single and commonly available tool.

Another object of the present invention is to provide a new motion absorbing hitch that reduces forces transferred to a towing vehicle by a trailer assembly.

Still another object of the present invention is to provide a smoother ride for occupants in a towing vehicle.

Yet another object of the present invention is to provide enhanced control of a towing vehicle while towing a trailer assembly.

Yet still another object of the present invention is to reduce wear and stress on the towing vehicle and the trailer assembly during towing.

To this end, the present invention generally comprises a towing attachment assembly coupled to a towing vehicle, a trailer attachment assembly pivotally coupled to the towing attachment assembly and adapted for coupling to a trailer assembly, and a shock absorbing assembly coupled between the towing attachment assembly and the trailer attachment assembly to dampen pivoting between the towing attachment assembly and the trailer attachment assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
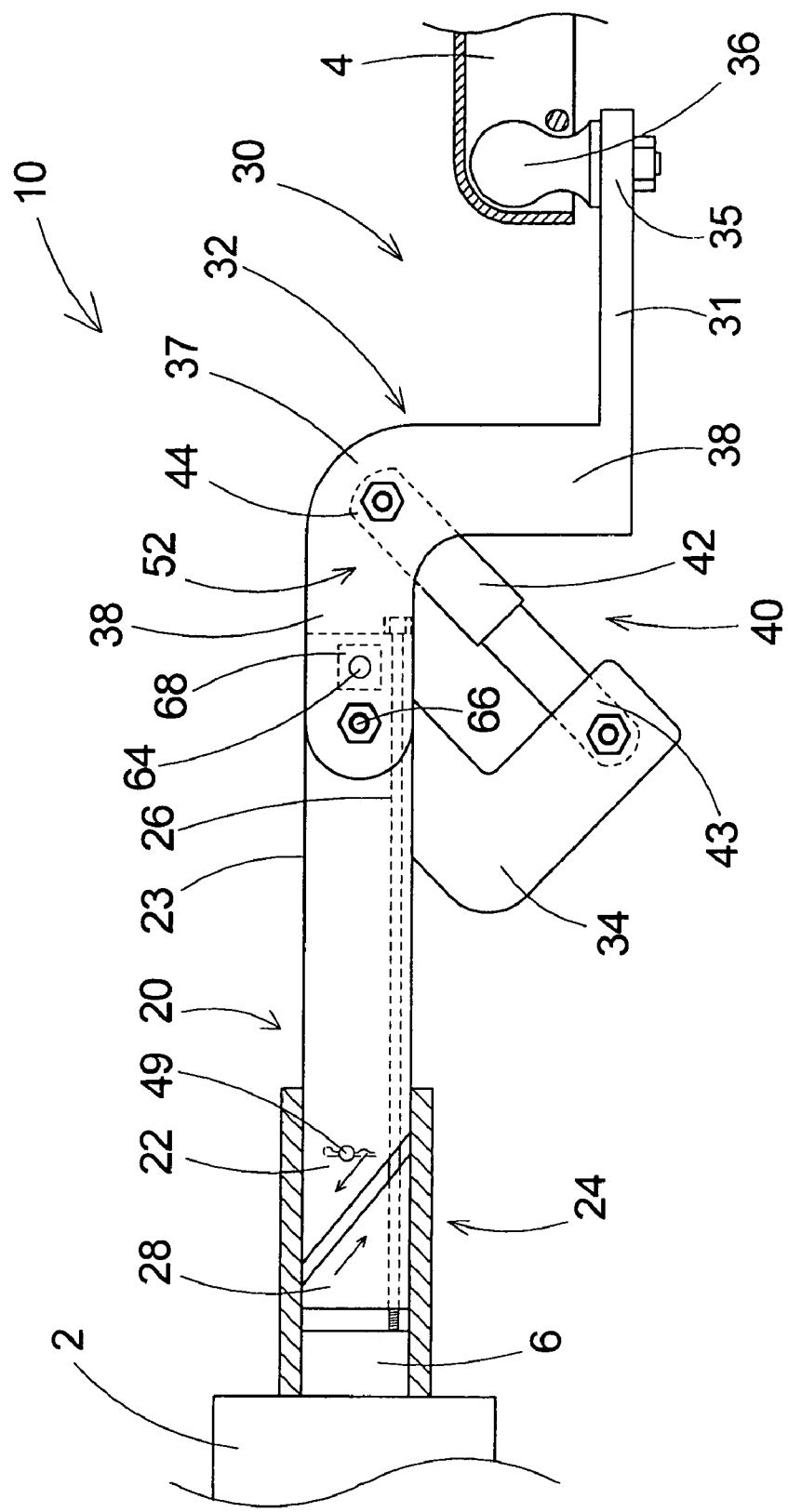
FIG. 1 is a side view of a new motion absorbing hitch according to the present invention.
Figure 2:
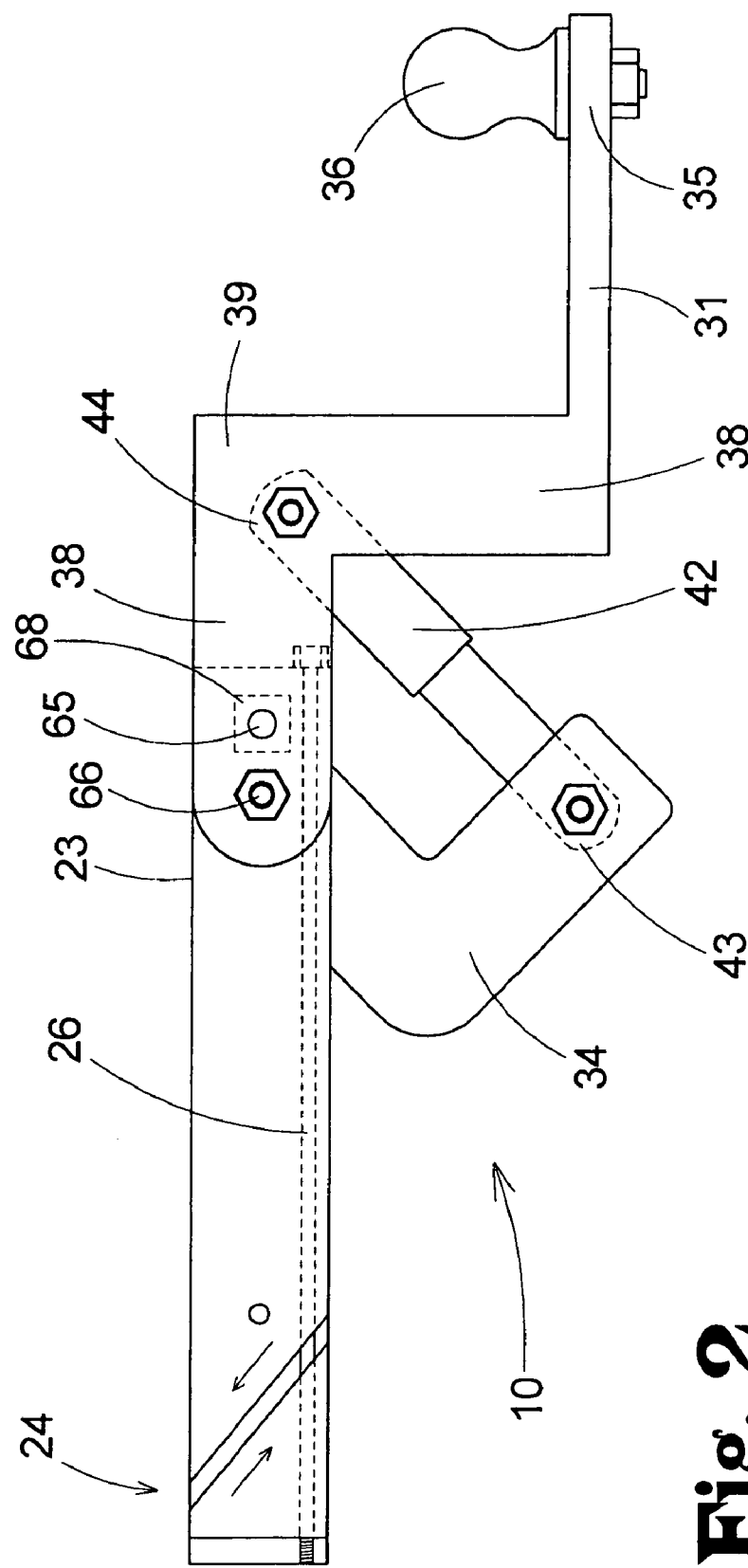
FIG. 2 is a side view of an alternate embodiment of the present invention.
Figure 3:
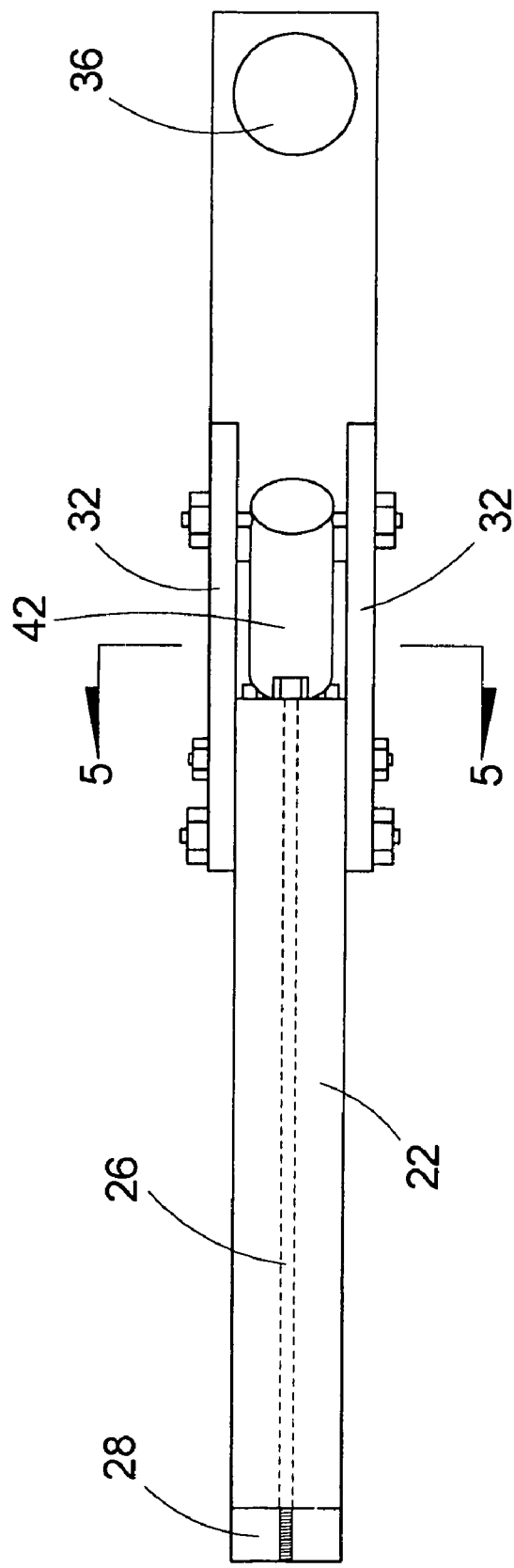
FIG. 3 is a top view of the present invention.
Figure 4:
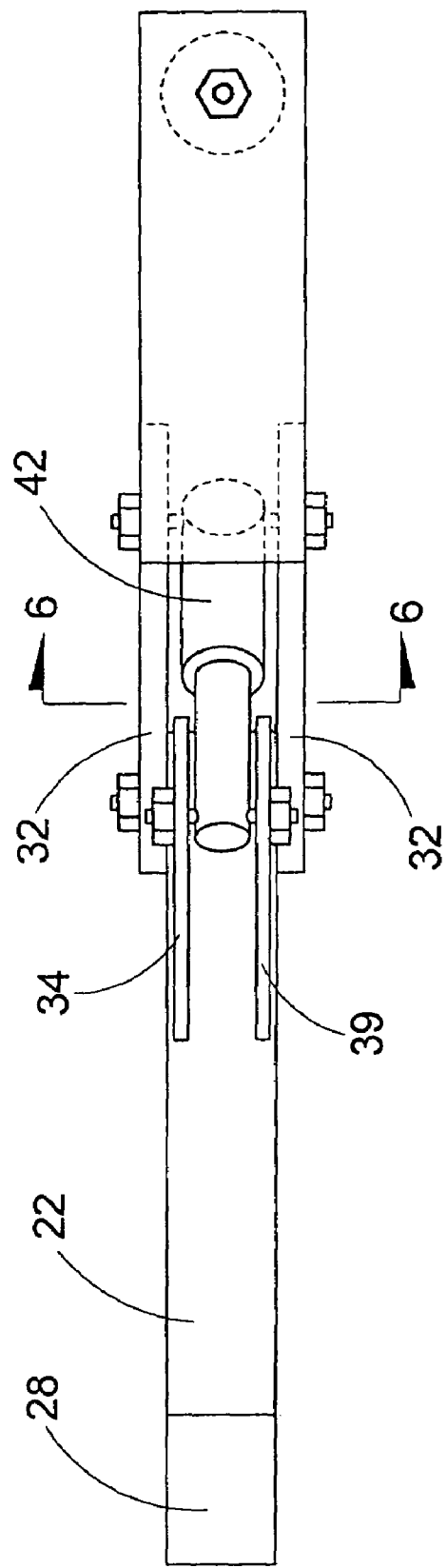
FIG. 4 is a bottom view of the present invention.
Figure 5:
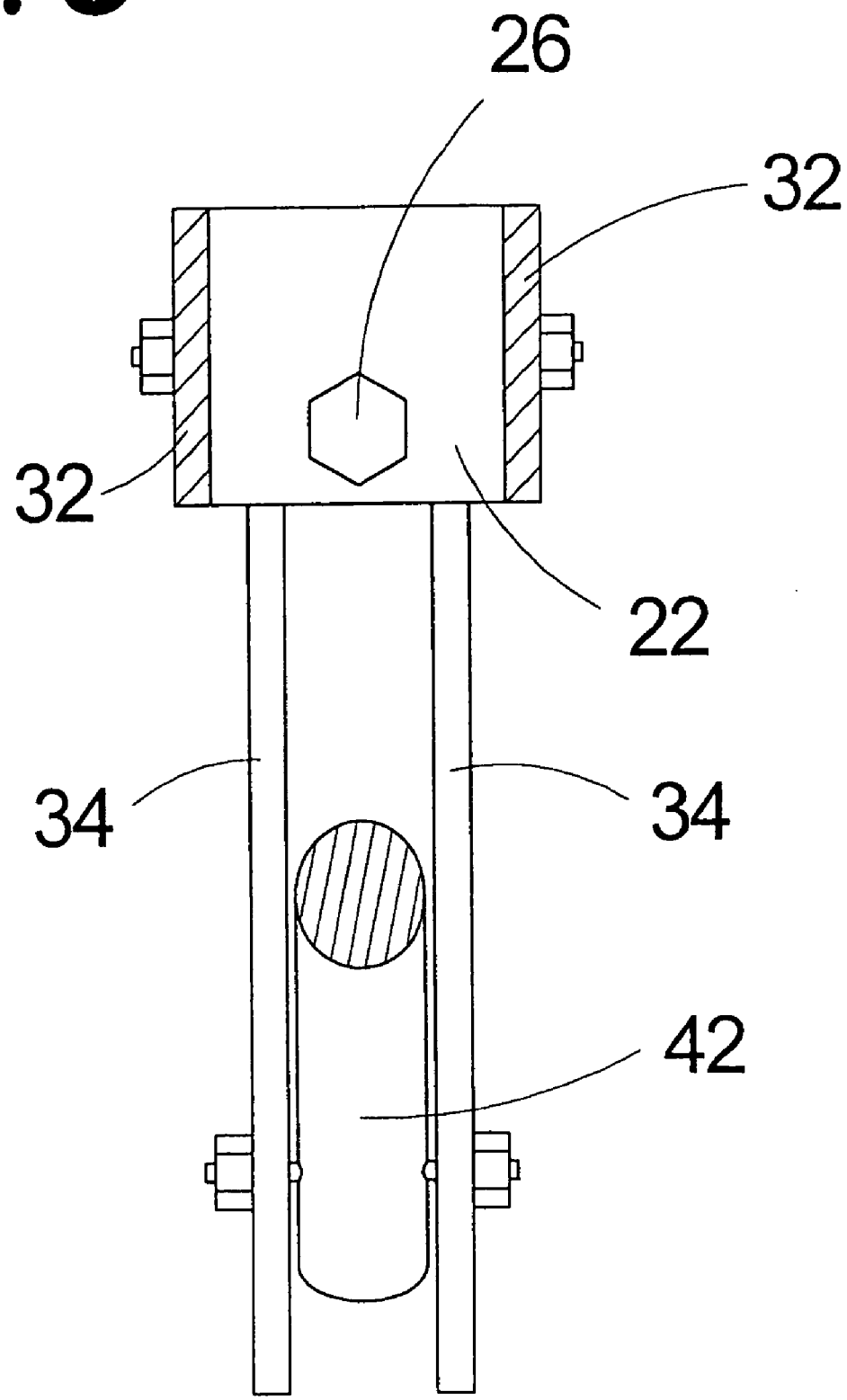
FIG. 5 is a cross-section taken along line 5—5 of FIG. 3.
Figure 6:
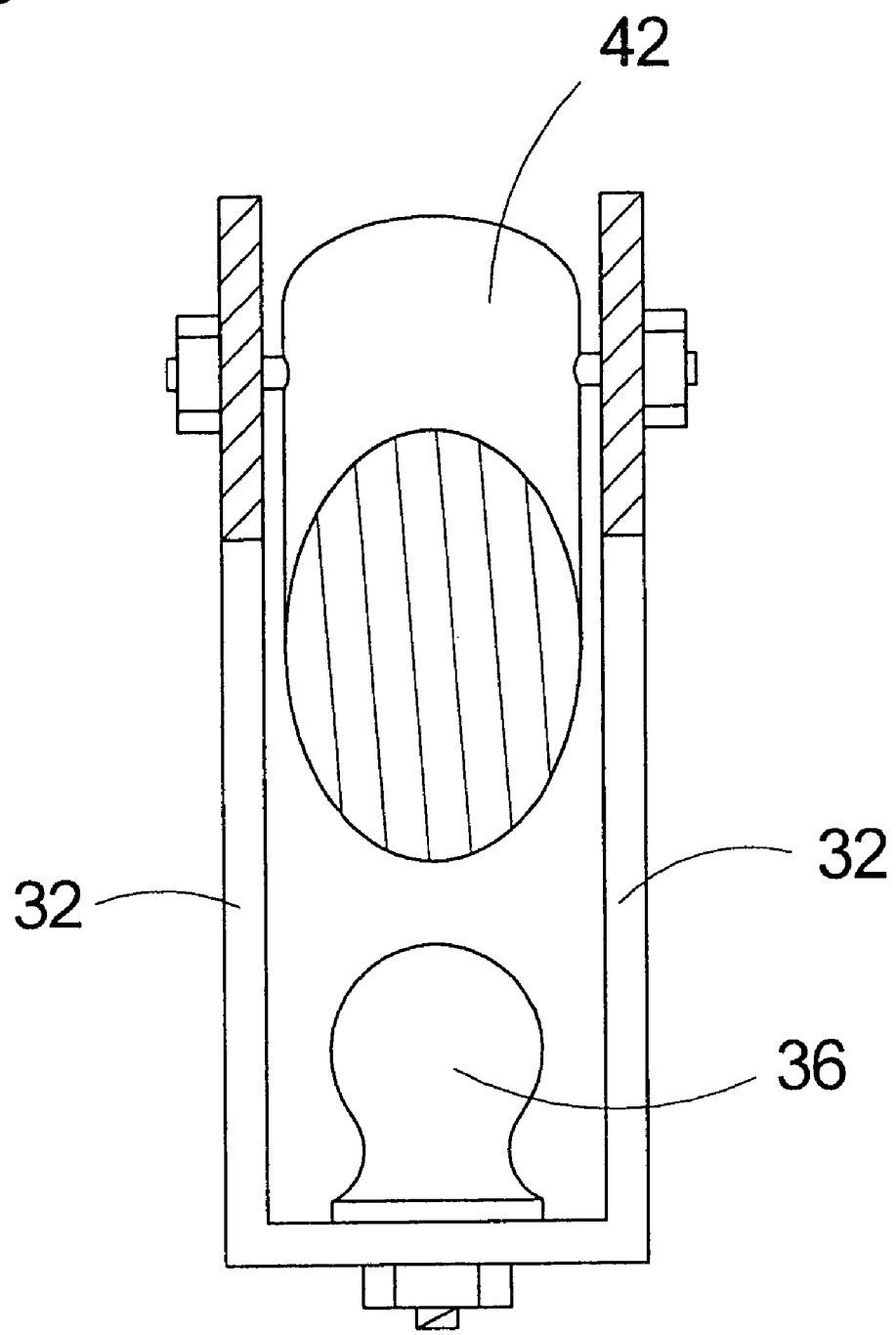
FIG. 6 is a cross-section taken along line 6—6 of FIG. 4.
Figure 7:
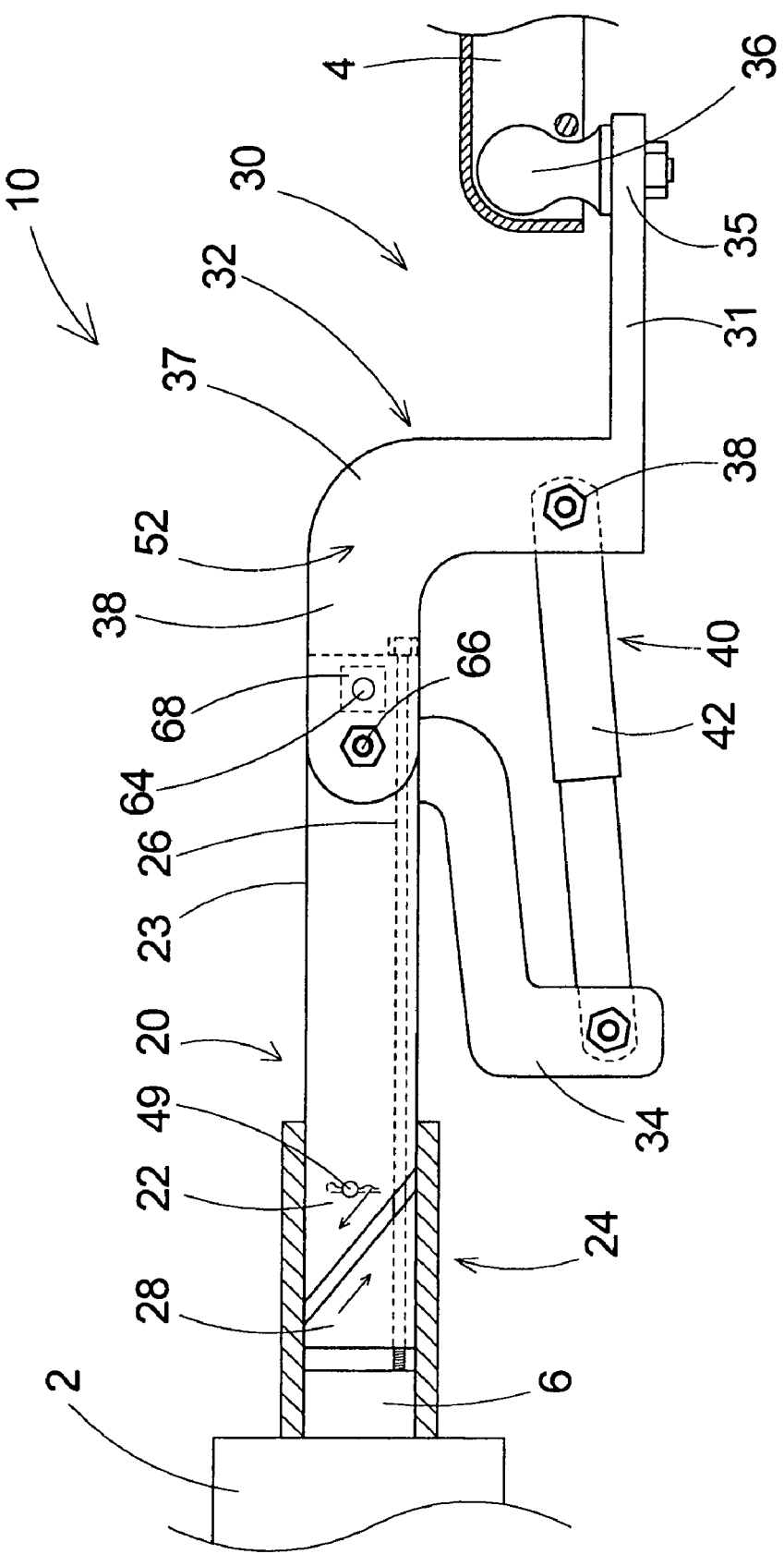
FIG. 7 is a side view of an alternate embodiment of the present invention.
Figure 8:
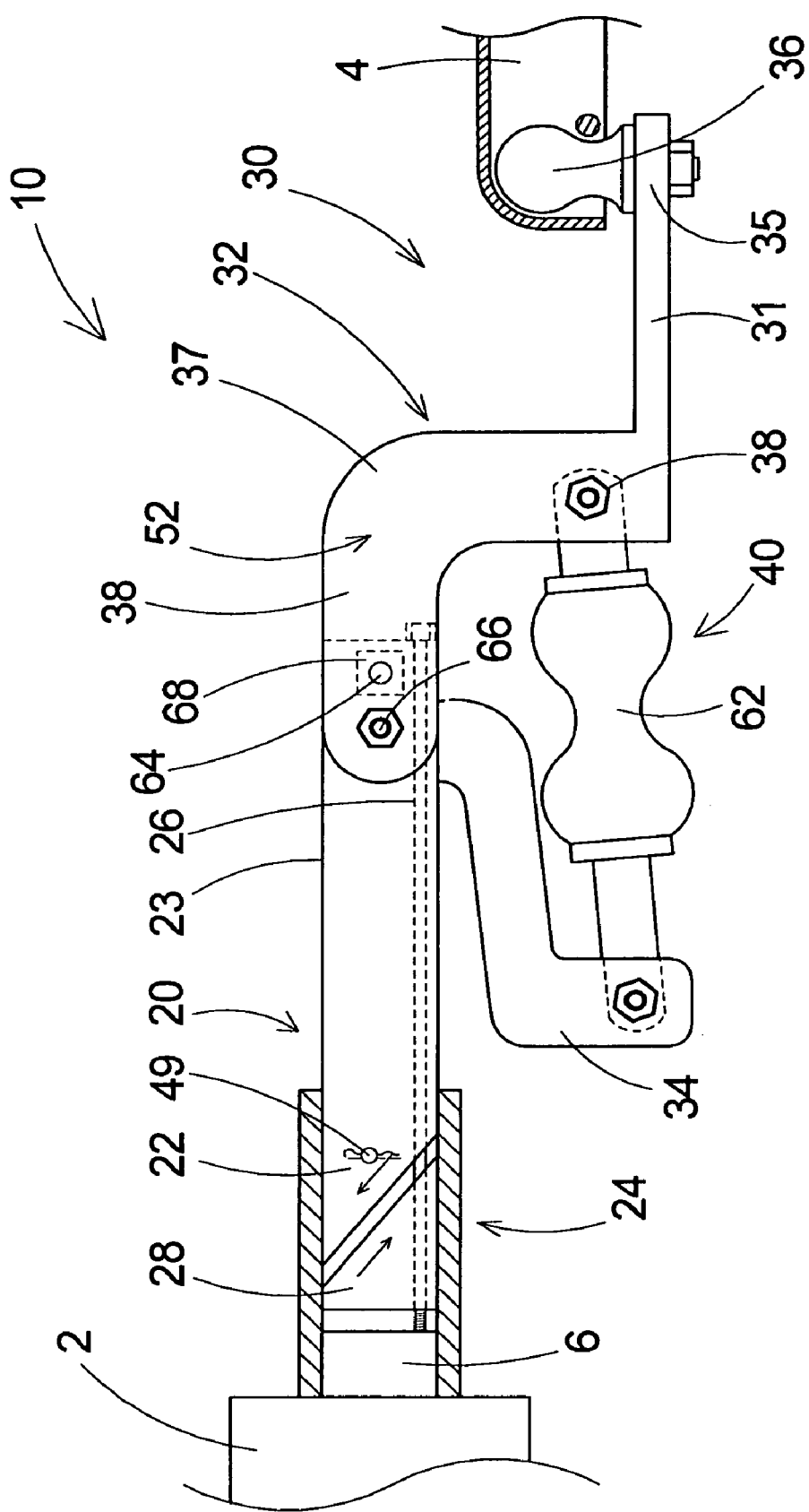
FIG. 8 is a side view of an alternate shock absorbing assembly for either embodiment.

With reference now to the drawings, and in particular to FIGS. 1 through 8 thereof, a new motion absorbing hitch embodying the principles and concepts of the present invention and generally designated by the reference numeral 10 will be described.

As best illustrated in FIGS. 1 through 8, the motion absorbing hitch 10 generally comprises a towing attachment assembly 20 coupled to a towing vehicle 2. A trailer attachment assembly 30 is pivotally coupled to the towing attachment assembly 20. The trailer attachment assembly 30 is designed for coupling to a trailer assembly 4. A shock absorbing assembly 40 is coupled between the towing attachment assembly 20 and the trailer attachment assembly 30 to dampen pivoting between the towing attachment assembly 20 and the trailer attachment assembly 30.

The towing attachment assembly 20 has a main portion 22 and a wedge clamp 24 extending from the main portion 22 for engaging a receiver hitch 6. The end of the towing attachment assembly 20 is inserted into the receiver hitch 6 and the screw 26 is turned to move the end piece 28 towards the main portion 22. The angled surfaces between the end piece 28 and the main portion 22 urge the pieces to expand in the receiver hitch 6 to firmly engage the towing attachment assembly 20 to the receiver hitch 6. For additional safety, a cotter pin 49 or similar locking member is insertable through the main section 22 and the receiver hitch to prevent disengagement.

The main portion 22 of the towing attachment assembly 20 forms a shock attachment arm 34 extending from the main portion 22. The shock absorbing assembly 40 extends between the shock attachment arm 34 and the trailer attachment assembly 30.

The shock absorbing assembly 40 includes a shock absorber 42 that has a first end 43 pivotally coupled to the towing attachment assembly 20 and a second end 44 pivotally attached to the trailer attachment assembly 30.

The trailer attachment assembly 30 has a generally L-shaped main section 32 that includes a first end 33 pivotally coupled to the towing attachment assembly 20. A trailer attachment means 36 extends from a second end 35 of a plate 31 extending from the generally L-shaped main section 32. The trailer attachment means 36 typically comprises a ball hitch. The trailer attachment assembly 30 includes a pair of flanges 38 forming the generally L-shaped main section 32 and the flanges 38 are pivotally coupled to opposite sides of main portion 22. In an embodiment, the second end 44 of the shock absorber 42 is pivotally coupled to a junction 39 between the pair of flanges 38 forming the L-shaped main section 32.

The proximal end 23 extends outwardly past a pivot point 66 between the main portion 22 and the main section 32. Aligned holes 64 are positioned in main section 32, one on each flange 38, to align with a locking aperture 68 in the proximal end 23 to restrict pivoting of the main section 32 relative to the main portion 22 by insertion of a restriction pin 65 through the holes 64 and aperture 68. In an embodiment, the aperture 68 is larger than the holes so that pivoting is restricted as opposed to completely prevented. However, the holes 64 and aperture 68 may be sized to completely restrict pivoting if desired.

The ball hitch 36 and the pivot point 66 are preferably positioned such that the pivot point is elevated between 35 and 55 degrees above horizontal relative to the ball hitch 36.

In an embodiment, the shock absorber 42 is oriented at an angle between 35 and 55 degrees from vertical when the shock absorber 42 is in a neutral position between being extended and being compressed. Thus, the shock absorber 42 provides dampening to up and down movement as well as movement forward and back between the towing vehicle and the trailer assembly.

As an alternative to the shock absorber 42, the shock absorbing assembly 40 may comprise an air bag assembly 62.

It is intended that the generally L-shaped main section 32 may have an arcuate medial portion 37 thus forming arcuate section 52 that forms approximately a quarter circle. The second end 44 of the shock absorber 42 is pivotally coupled to the medial portion 37 of the arcuate section such that the shock absorber 42 is oriented at an angle between 35 and 55 degrees from vertical when the shock absorber is in a neutral position between being extended and being compressed.

The shock attachment arm 34 extends from a proximal end 23 of the main portion 22. In an embodiment, the shock attachment arm 34 is preferably arcuate and extends such that the second end 44 of the shock absorber 42 is positioned vertically below the proximal end 23 of the main portion 22 of the towing attachment assembly 20. Similar to the structure of the portion of the main section 32 formed by flanges 38, the shock attachment arm 34 is preferably formed by two planar pieces, each having a first end fixedly attached to the main portion 22 and a second end pivotally coupled to a respective side of the shock absorber. Thus, the structure of the portion of the main section 32 formed by flanges 38 and the shock attachment arm 34 facilitate access to the screw 26 for attaching and detaching the invention from the receiver hitch of the towing vehicle.

In another embodiment, a generally S-shaped shock attachment arm 34' is used and the second end 44 of the shock absorber 42 or air bag assembly 62 is attached to a lower area 61 of the main section 32 such that a longitudinal axis of the shock absorber 42 or air bag assembly 62 is positioned at approximately a 5–15 degree angle from horizontal.

In use, the invention is attached between a towing vehicle and a trailer assembly. The invention pivots but provides a shock absorbing assembly to dampen the pivoting, thus dampening forces transferred between the towing vehicle and the trailer assembly.

It is noted that various features have been noted as being present in an embodiment. Except where these features are mutually exclusive, it is intended that any of the above features may be interchanged or combined as desired.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the present disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A force dampening hitch assembly comprising:
   a towing attachment assembly, said towing attachment assembly being adapted for coupling to a towing vehicle;
   a trailer attachment assembly pivotally coupled to the towing attachment assembly, said trailer attachment assembly being adapted for coupling to a trailer assembly; and
   a shock absorbing assembly coupled between the towing attachment assembly and the trailer attachment assembly to dampen pivoting between the towing attachment assembly and the trailer attachment assembly;
   wherein said towing attachment assembly includes a main portion and a shock attachment arm extending from said main portion, said shock absorbing assembly extending between said shock attachment arm and said trailer attachment assembly;
   wherein said shock attachment arm extends from a proximal end of said main portion back towards a distal end of said towing attachment assembly;
   said shock absorbing assembly including a shock absorber having a first end pivotally coupled to said towing attachment assembly and a second end pivotally attached to said trailer attachment assembly;
   said trailer attachment assembly including a pair of flanges forming a generally L-shaped main section having a first end pivotally coupled to said towing attachment assembly; and
   a trailer attachment means extending from a second end of said generally L-shaped main section for coupling to the trailer assembly.

2. The force dampening hitch assembly of claim 1 wherein said second end of said shock absorber is pivotally coupled to a junction between said pair of flanges forming said L-shaped main section.

3. A force dampening hitch assembly comprising:
   a towing attachment assembly, said towing attachment assembly being adapted for coupling to a towing vehicle;
   a trailer attachment assembly pivotally coupled to the towing attachment assembly, said trailer attachment assembly being adapted for coupling to a trailer assembly; and
   a shock absorbing assembly coupled between the towing attachment assembly and the trailer attachment assembly to dampen pivoting between the towing attachment assembly and the trailer attachment assembly;
   wherein said towing attachment assembly includes a main portion and a shock attachment arm extending from said main portion, said shock absorbing assembly extending between said shock attachment arm and said trailer attachment assembly;

wherein said shock attachment arm extends from a proximal end of said main portion back towards a distal end of said towing attachment assembly; and said shock absorbing assembly including an air bag assembly having a first end pivotally coupled to said shock attachment arm and a second end pivotally attached to said trailer attachment assembly.

4. The force dampening hitch assembly of claim 3 further comprising:

said trailer attachment assembly including an arcuate section having a first end pivotally coupled to said towing attachment assembly; and a trailer attachment means extending from a second end of said arcuate section for coupling to the trailer assembly.

5. The force dampening hitch assembly comprising:

a towing attachment assembly, said towing attachment assembly being adapted for coupling to a towing vehicle;

a trailer attachment assembly pivotally coupled to the towing attachment assembly, said trailer attachment assembly being adapted for coupling to a trailer assembly; and a shock absorbing assembly coupled between the towing attachment assembly and the trailer attachment assembly to dampen pivoting between the towing attachment assembly and the trailer attachment assembly;

wherein said towing attachment assembly includes a main portion and a shock attachment arm extending from said main portion, said shock absorbing assembly extending between said shock attachment arm and said trailer attachment assembly;

wherein said shock attachment arm extends from a proximal end of said main portion back towards a distal end of said towing attachment assembly; and said proximal end being alignable with a main section of said trailer attachment assembly, said main section having a hole alignable with a restriction aperture in said main portion; and a restriction pin insertable through said hole and said aperture for restricting a range of pivoting between said towing attachment assembly and said trailer attachment assembly.

6. The force dampening hitch assembly of claim 5 wherein said main portion of said towing attachment assembly has a wedge clamp for engaging a receiver hitch.

7. The force dampening hitch assembly of claim 5 wherein said shock absorbing assembly comprises a shock absorber having a first end pivotally coupled to said towing attachment assembly and a second end pivotally attached to said trailer attachment assembly.

8. The force dampening hitch assembly of claim 7 wherein said shock absorber is oriented at an angle between 35 and 55 degrees from vertical when said shock absorber is in a neutral position between being extended and being compressed.

9. The force dampening hitch assembly of claim 5 wherein said trailer attachment assembly includes a generally L-shaped main section having a first end pivotally coupled to said towing attachment assembly; and a trailer attachment means extending from a second end of said generally L-shaped main section for coupling to the trailer assembly.

10. The force dampening bitch assembly of claim 5, further comprising:

said shock absorbing assembly including a shock absorber having a first end pivotally coupled to said towing attachment assembly and a second end pivotally attached to said trailer attachment assembly;

said trailer attachment assembly including an arcuate section having a first end pivotally coupled to said trailer attachment assembly; and a trailer attachment means extending from a second end of said arcuate section for coupling to the trailer assembly.

11. The force dampening hitch assembly of claim 10 wherein said second end of said shock absorber is pivotally coupled to a medial portion of said arcuate section such that said shock absorber is oriented at an angle between 35 and 55 degrees from vertical when said shock absorber is in a neutral position between being extended and being compressed.

12. The force dampening hitch assembly of claim 5 further comprising:

said shock absorbing assembly including a shock absorber having a first end pivotally coupled to said shock attachment arm and a second end pivotally attached to said trailer attachment assembly.

13. The force dampening hitch assembly of claim 12 wherein said shock attachment arm is arcuate.

14. The force dampening hitch assembly of claim 13 wherein said second end of said shock absorber is positioned vertically below said proximal end of said main portion of said towing attachment assembly.

15. The force dampening hitch assembly of claim 5 wherein a second end of said shock absorbing assembly is positioned vertically below said main portion of said towing attachment assembly;

wherein a first end of said shock absorbing assembly is pivotally coupled to a lower area of a main section of said trailer attachment assembly.

16. The force dampening hitch assembly of claim 15 wherein a longitudinal axis of said shock absorbing assembly is positioned at an angle between 5 and 15 degrees from horizontal.

17. The force dampening hitch assembly of claim 5 wherein said aperture and said hole are different sizes to prevent total restriction of pivoting between said towing attachment assembly and said trailer attachment assembly.

* * * * *